L. REICH.
Beer Cooler.
No. 53,677.
Patented April 3, 1866.
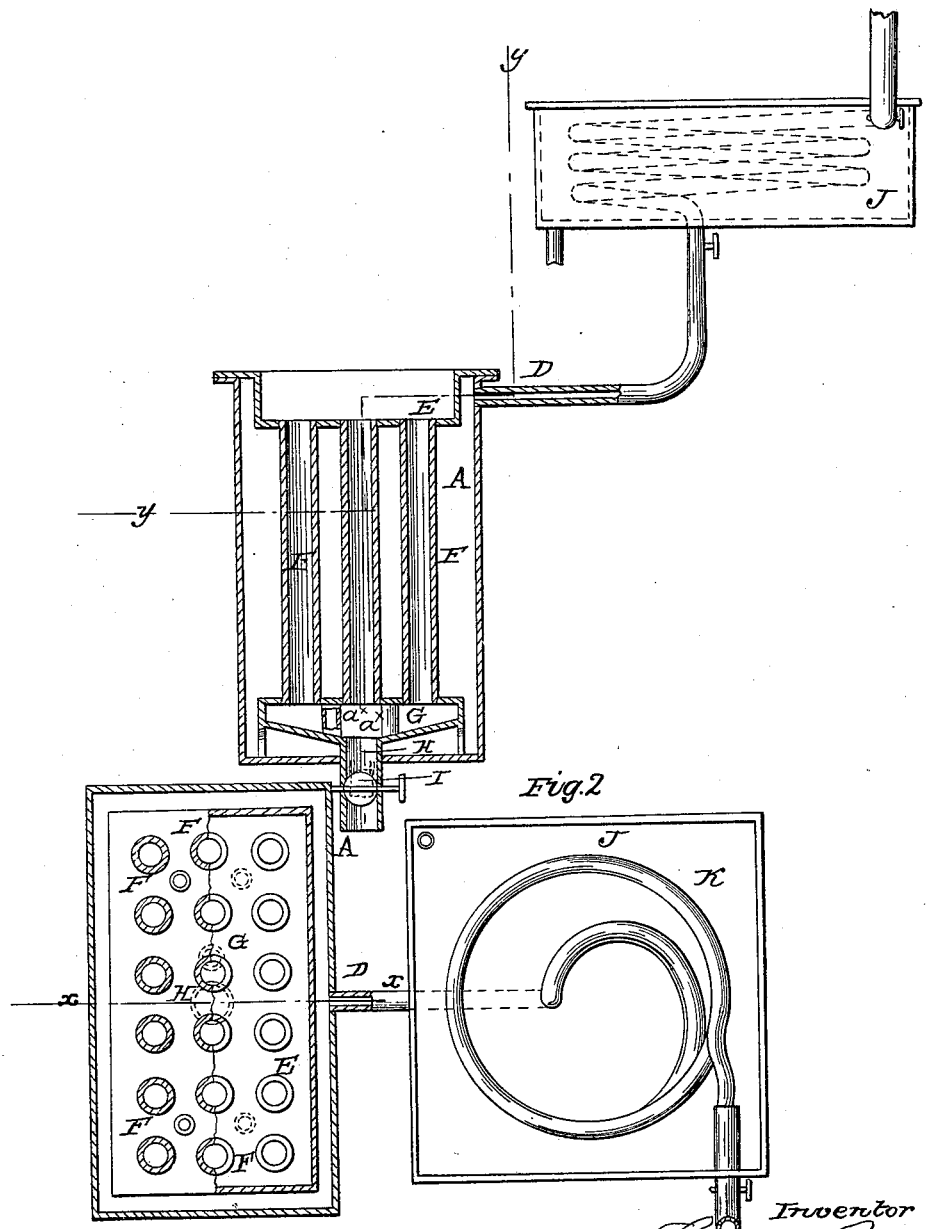

UNITED STATES PATENT OFFICE.

LUDVIG REICH, OF NEW YORK, N. Y.

IMPROVED COOLER FOR BREWING AND DISTILLING.

Specification forming part of Letters Patent No. 53,677, dated April 3, 1866.

*To all whom it may concern:*

Be it known that I, LUDVIG REICH, of the city, county, and State of New York, have invented a new and Improved Cooler for Distilling and Brewing Purposes; and I do hereby declare that the following is a full, clear, and exact description thereof, which will enable others skilled in the art to make and use the same, reference being had to the accompanying drawings, forming part of this specification.

This invention relates to a new and improved apparatus for cooling worts for brewing and distilling purposes.

The object of the invention is to obtain a device for the purpose specified which will have a large cooling-surface and at the same time not present a large area of the worts exposed to favor evaporation.

The invention consists in a series of tubes communicating at their upper ends with a pan or shallow vessel which receives the worts, said pan and tubes being fitted in a vessel, through which a current of cold water passes, and the lower ends of the tubes communicating with a box which is also within the cold-water vessel, and is provided with a discharge-tube, which passes through the bottom of said vessel. The worts is allowed to pass through these tubes with greater or less rapidity by adjusting a valve in the discharge-tube.

Figure 1 is a side sectional view of my invention, taken in the line $x\,x$, Fig. 2; Fig. 2, a plan sectional view of the same, taken in the line $y\,y$, Fig. 1.

Similar letters of reference indicate like parts.

A represents a vessel, which may be of rectangular or other proper form and of any suitable dimensions. This vessel may be constructed of wood or metal, and it has a discharge-tube, C, at its bottom, and a supply-tube, D, enters its upper end.

E is a shallow pan which fits into the upper part of the vessel A, said pan being provided with a flange, $a$, extending all around it, to rest upon the upper edge of vessel A.

F is a series of tubes, the upper ends of which communicate with the pan E, the lower ends communicating with a box, G, which rests upon the bottom of vessel A, and has an inclined bottom, to admit of the flow of the worts through a tube, H, which passes through the bottom of vessel A, the tube H having a valve, I, in it, by which the discharge of the worts may be regulated. The tubes F are not in close contact. Ample space is allowed between them for the circulation of the cold water around them.

J is an ice-chamber containing a coil-pipe, K, which is part of or communicates with the supply-tube D. The water, in passing through this coil-pipe K, is rendered cool or reduced in temperature, and consequently enters the upper part of the vessel A in a cool state, and in passing around the tubes F and underneath the pan E, and also around and underneath the box G and through tubes $a^x$, which pass through G, cools the worts, which is discharged through the tube H, the flow being regulated by the valve I. The flow of water from the tube C of the vessel A may also be regulated by a valve. During cold weather or the winter season the ice-chamber J may be dispensed with, as water sufficiently cold without it may be had to pass directly into A.

By this arrangement a large cooling-surface is obtained for the worts to pass through, and but little chance afforded for evaporation to reduce its strength.

Having thus described my invention, what I claim as new, and desire to secure by Letters Patent, is—

The pan E, tubes F, and box G, communicating with each other, and provided with the cold-water vessel A and with or without the ice-chamber J, all arranged substantially as and for the purpose herein set forth.

LUDVIG REICH.

Witnesses:
M. M. LIVINGSTON,
ALEX. F. ROBERTS.